United States Patent [19]
Danihel

[11] 3,951,633
[45] Apr. 20, 1976

[54] METHOD FOR PRODUCING PATTERNED GLASS ON A FLOAT RIBBON

[75] Inventor: William Thomas Danihel, Bethel Park, Pa.

[73] Assignee: Combustion Engineering, Inc., Windsor, Conn.

[22] Filed: Dec. 23, 1974

[21] Appl. No.: 535,911

[52] U.S. Cl. .................................. 65/23; 65/65 A; 65/99 A
[51] Int. Cl.² ........................................ C03B 18/02
[58] Field of Search ..................... 65/23, 65 A, 99 A

[56] References Cited
UNITED STATES PATENTS

| | | | |
|---|---|---|---|
| 3,300,289 | 1/1967 | Long | 65/65 A X |
| 3,442,748 | 5/1969 | D'Huart | 65/23 X |

Primary Examiner—Arthur D. Kellogg
Attorney, Agent, or Firm—Frederick A. Goettel, Jr.

[57] ABSTRACT

A method for patterning or texturing the surface of glass manufactured by the float process. The method comprises depositing particulate carbon onto the surface of a continuous ribbon of heat softened glass which is being drawn across a molten metal bath, the ribbon being cooled into a structurally integral sheet during this process. The deposited carbon attacks the surface of the glass to thereby produce a patterned or textured finish thereon.

9 Claims, 5 Drawing Figures

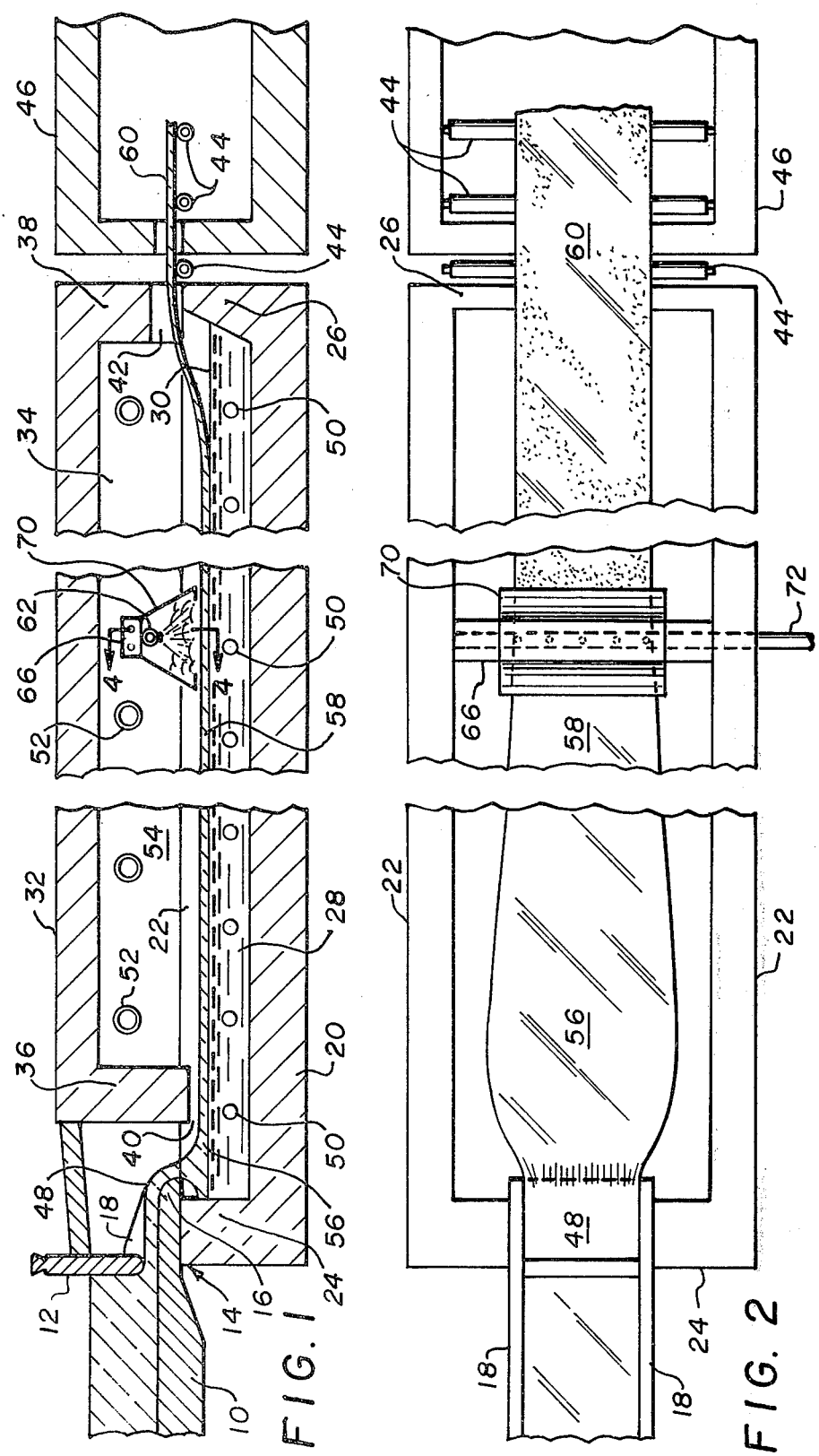

METHOD FOR PRODUCING PATTERNED GLASS ON A FLOAT RIBBON

BACKGROUND OF THE INVENTION

The present invention relates to a method for producing patterned or textured glass, and more particularly to a method for patterning or texturing the surface of glass manufactured according to the float process.

As is known in the art in the manufacture of glass by the float process, molten glass is poured at controlled rates onto a molten metal bath, such as tin, to form a continuous ribbon of heat softened glass. The heat softened glass ribbon is then drawn across the metal bath while the ribbon is cooled along its length to produce a structurally integral sheet of glass. The ribbon or sheet is then withdrawn from the surface of the molten metal bath into an annealing lehr where the glass is then heat treated in a conventional manner.

With the float glass process, the only type of glass in practice which is generally produced is glass with plain parallel fire-polished surfaces. For the production of glass with patterned or textured surfaces, use has generally been made of either the so-called rolling method in which the glass strip or ribbon is formed at high temperatures by a pair of rolls which have an embossed roll surface which acts upon the glass surface, or the transparent glass sheet is superficially treated while cold by etching, sand blasting or other suitable surface treatment so as to produce the ornamental form of glass product desired.

Also, more recently, processes have been developed for patterning or texturing the surface of glass when the ribbon is in the float chamber on the molten bath. These processes have involved the use of a non-adhesive friction tool which is moved across the ribbon to roughen its surface or the use of gas jets within the float chamber which direct gas at the moving glass while the glass is still soft enough to displace portions of its surface. In both of these more recent methods the patterning or texturing of the surface takes place while the glass ribbon is heat softened and then the ribbon is cooled to preserve, at least partially, the patterning or texturing that has taken place.

SUMMARY OF THE INVENTION

The present invention involves a novel method for patterning, texturizing or embossing the surface of glass which is manufactured by the float process. In a float glass process in which molten glass is introduced at a controlled rate onto the surface of a molten metal bath to form a continuous ribbon of heat softened glass and in which the ribbon is then drawn across the bath and cooled into a structurally integral sheet, particulate carbon is deposited onto the upper surface of the ribbon as it is being drawn across the molten metal bath. The ribbon of glass is then removed from the molten metal bath and introduced into an annealing lehr. The particulate carbon attacks the surface of the glass so as to provide a textured surface thereto and after the glass is removed from the annealing lehr, the surface is completely clean and free from the particulate carbon which was deposited on the glass in the float chamber.

In the preferred form of the present invention, the particulate carbon is deposited on the surface of the float ribbon by means of spraying powdered carbon from above the bath as the ribbon is drawn across the bath. Preferably the carbon is sprayed onto the surface when the ribbon is only partially cooled after having been introduced onto the molten metal bath, the ribbon then being further cooled before it is removed from the bath and passed into the annealing lehr. Preferably the powdered carbon which is sprayed onto the surface of the ribbon is of a size which ranges between 30 and 900 microns.

Also in the preferred form, the powdered carbon is sprayed onto the ribbon when the ribbon is at a temperature at which the particulate carbon particles will only partially imbed in the surface of the glass and the ribbon is then removed from the molten metal bath when it is at a temperature which is greater than the automatic ignition temperature of the particular carbon that was deposited thereon. In accordance with this procedure, the structurally integral sheet of glass upon removal from the annealing lehr is textured and clean and free of the carbon particles so that no further treatment is required.

BRIEF DESCRIPTION OF THE DRAWINGS

FIG. 1 is a side sectional view of a float glass chamber including portions of the delivery end of a glass melting furnace at the left end and the annealing lehr at the right end in which the method in accordance with the present invention is carried out.

FIG. 2 is a plan view of the float chamber of FIG. 1 for carrying out the method of the present invention.

DESCRIPTION OF THE PREFERRED EMBODIMENT

Figure 3:
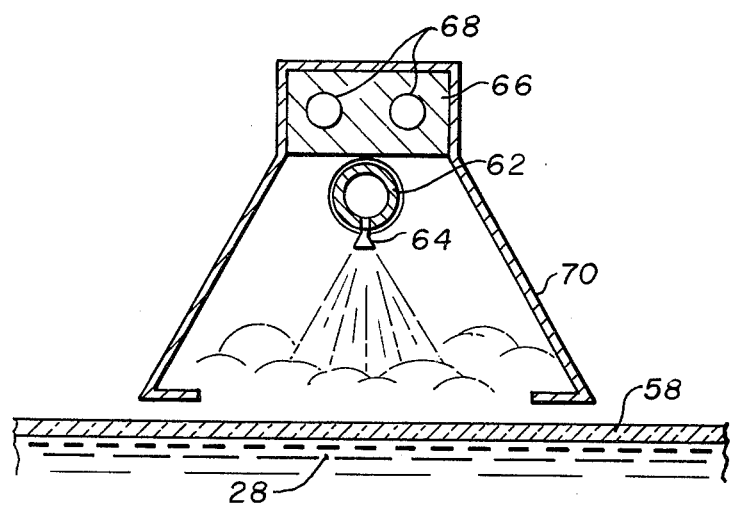
FIG. 3 is an enlarged view of a sprayer system used in the float chamber shown in FIG. 1 for carrying out the present invention.

Referring to FIGS. 1 and 2 of the drawings, a forehearth of a continuous glass melting furnace is indicated at 10 and a regulating tweel at 12. The forehearth 10 ends in a spout 14 comprising a lip 16 and side jams 18, one of which is shown in FIG. 1. The lip 16 and side jams 18 together constitute a spout of generally rectangular cross section.

The spout 14 is disposed above the floor 20 of an elongated tank structure including sidewalls 22 joined together to form an integral structure with the floor 20, and an end wall 24 at the inlet end of the tank and an end wall 26 at the outlet end of the tank. The tank structure holds a bath of molten metal 28 whose surface level is indicated at 30. The bath is, for example, a bath of molten tin or a molten tin alloy in which the tin predominates and which has a specific gravity greater than that of the glass.

A roof structure supported over the tank structure includes a roof 32, sidewalls 34 and integral end walls 36 and 38 respectively at the inlet and outlet ends of the bath. The inlet end wall 36 extends downwardly close to the surface 30 of the molten metal to define with that surface an inlet 40 which is restricted in height and through which molten glass is advanced along the bath.

The outlet end wall 38 of the roof structure defines with the outlet end wall 26 of the tank structure an outlet 42 through which the ultimate ribbon of glass produced from the bath is discharged onto driven conveyor rollers 44 mounted outside the outlet end of the tank structure and disposed somewhat above the level of the top of end wall 26 of the tank structure so that the ribbon is lifted clear of the wall 26 for discharge through the outlet 42. The rollers 44 convey the ultimate ribbon of glass to an annealing lehr 46 in a well-known manner and also apply tractive effort to the ribbon of glass to assist in advancing the ribbon as it glides along the surface of the bath 28.

Molten glass 48, for example, molten soda lime silica glass, is poured onto the bath 10 of the molten metal from the spout 14 and the tweel 12 regulates the rate of flow of the molten glass 48 over the spout lip 16 to form a layer of molten glass in the bath. The temperature of the glass as it is advanced along the bath is regulated from the inlet end, where the temperature is usually about 2100°F down to the discharge end, where the temperature is usually about 1000°-1100°F, by temperature regulators 50 immersed in the bath 10 and temperature regulators 52 mounted in the head space 54 defined by the roof structure over the bath. The temperature of the glass can vary at the inlet end between 1600° and 2200°F and at the outlet end between 900° and 1200°F.

A plenum of protective gas is maintained in the substantially closed head space 54. The protective gas is supplied through appropriate ducts (not shown) in the roof structure and preferably contains a reducing constituent. For example, the protective atmosphere may consist of 10% hydrogen and 90% nitrogen. There is a small outward flow of protective gas through the inlet 40 and outlet 42 from the head space 54.

The temperature of the molten glass delivered to the bath is regulated by the temperature regulators 50 and 52 as the glass is advanced along the bath so as to insure that a layer of molten glass 56 is established on the bath. This layer 56 is advanced through the inlet 40 and during this advance there is unhindered lateral flow of the molten glass to develop on the bath surface from the layer 56 a buoyant body 58 of molten glass which is then advanced in ribbon form along the bath. The width of the tank structure at the surface level of the bath is greater than the width of the buoyant body or ribbon 48 of molten glass so that there is no limitation to the initial free lateral flow of the molten glass.

By properly controlling the rate of introduction of molten glass onto the molten metal bath, a glass ribbon 58 having a desired even thickness can be achieved. During its advance along the molten metal bath, the ribbon 58 is cooled into a structurally integral sheet 60 which may then be lifted from the bath at the discharge end 42 by the driven conveyor rollers 44 which pull the sheet 60 into the lehr 46 where the glass is annealed in a conventional manner. As can be appreciated, the fluidity of the ribbon 58 varies along its length as it is advanced across the molten metal bath.

Figure 4:
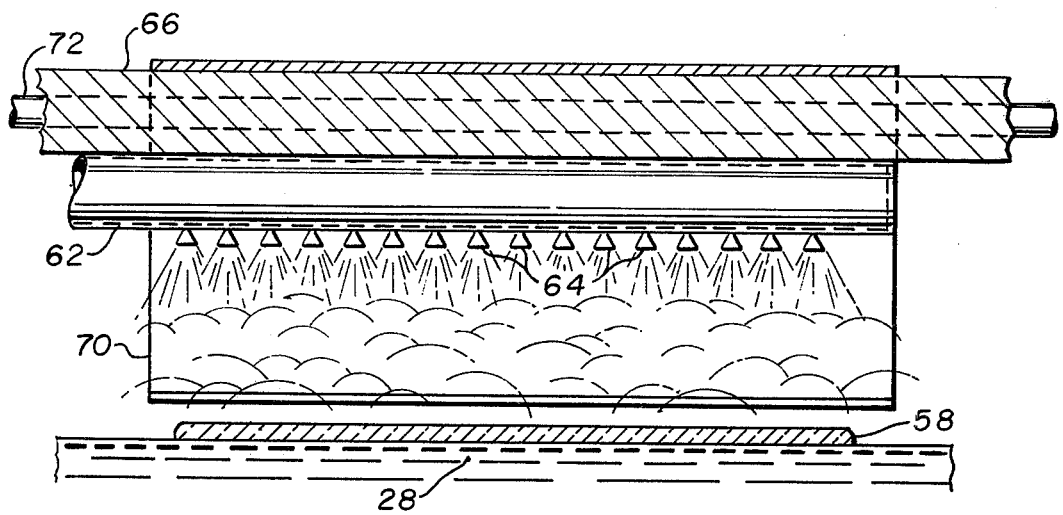
FIG. 4 is a front sectional view taken along lines 4—4 of FIG. 1.

A spray header 62 is mounted transversely of the tank structure just above the path of travel of the upper surface of the ribbon of glass 58 which is developed from the buoyant body. The spray header 62 is provided with a series of spray nozzles 64 along its length which communicate with the interior of the header 62 for directing a sprayed material, to be described hereinbelow, onto the surface of the advancing ribbon of glass 58. The spray header 62 is supported by a water cooled support beam 66 which in turn is supported from the side walls 34 of the roof structure. Water circulates through the conduits 68 of the beam 66 to cool the support beam 66 and spray header 62 in order to maintain the structural integrity thereof and to maintain the sprayed material at a relatively low temperature compared to the temperature of the glass ribbon 58. A hood 70 is supported from the support beam 66 around the spray header 62 to contain and give direction to the spray issuing from the spray header 62. The lower end of the hood 70 is maintained just above the path of travel of the upper surface of the ribbon of glass 58, say, for example, one-half inch. In the preferred form, the spray nozzles 64 along the underside of the spray header 62 are maintained above the surface of the ribbon of glass 58 a distance of approximately 6 to 8 inches. As can be seen in FIG. 4, each of the spray nozzles 64 of the spray header 62 are spaced from one another a small distance and extend substantially across the width of the ribbon of glass 58 so that the spray issuing therefrom will be substantially all deposited onto the surface of the advancing ribbon 58. The sprayed material is conducted to the interior of the spray header 62 by means of a supply line 72 extending through one of the side walls 34 of the roof structure.

The spray header 62 is located in the tank structure where the temperature of the glass ribbon 58 is approximately 1400°F. In the preferred embodiment where the inlet temperature of the molten glass 48 is approximately 2100°F and the temperature of the structurally integral sheet 60 being discharged from the tank structure is approximately 1000°F, the spray header 62 is located approximately two-thirds of the way downstream from the inlet end of the tank structure.

The sprayed material which is to be discharged onto the upper surface of the advancing ribbon of glass 58 comprises particulate carbon suspended in a carrier gas such as nitrogen. Nitrogen has been chosen a carrier in order to be compatible with the reduced atmosphere of protective gas which exists within the interior of the tank structure. The mixture of particulate carbon and nitrogen is supplied under pressure to the spray header 62 in order that the particulate carbon may be sprayed onto the surface of the glass 58. The pressure of the carbon-nitrogen mixture is not critical but need only be as great as necessary to insure that it will pass through the spray nozzles 64 and be directed downwardly onto the surface of the glass 58. The carbon supplied to the spray header 62 is substantially at room temperature and is maintained within the spray header 62 at a reduced temperature from that of the ribbon of glass 58 by means of the cooling conduits 68 of the support beam 66.

In the preferred form, the particulate carbon is comprised of powdered carbon having a particle size ranging between 30 to 900 microns. Such powdered carbon is commonly sold under the name sea coal.

Figure 5:
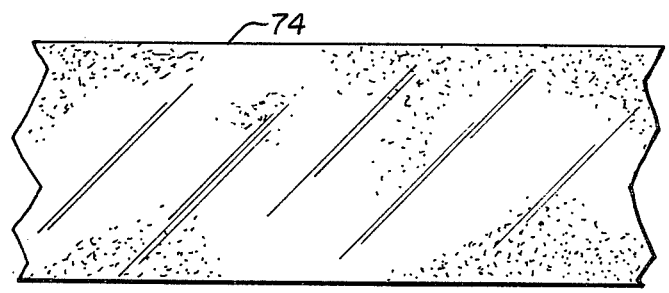
FIG. 5 is a plan view of a section of glass produced in accordance with the present invention.

With use of the above described procedure for depositing powdered carbon onto the surface of an advancing ribbon of glass 58, a patterned or textured surface is produced on the glass when it is removed from the annealing lehr 46. The patterned or textured surface of the glass 74, which is shown in FIG. 5, has numerous indentations thereon which give the glass 74 a frosted fiber appearance. The depth of the indentations within the surface of the glass 74 is of the order of several thousands of an inch. Also, upon removal from the annealing lehr 46, the surface of the glass 74 is completely clean of carbon which was deposited thereon in the molten metal bath and requires no further treatment.

While the specific mechanism of which the particulate carbon attacks the surface of the advancing ribbon glass 58 is not known, it is believed that the mechanism involves complete burning or combustion of the particles of carbon which have been deposited onto the surface of the glass 58 supported on the molten metal bath 28. This accounts for the fact that the surface of the glass is completely clean and requires no further treatment to produce the finished glass 74. As the atmosphere within the head space 54 contains substantially no oxygen, and since oxygen is necessary to have combustion or ignition of the carbon, it is believed that this burning or combustion of the carbon takes place at the entrance of the annealing lehr 46 which, although it also has a reduced atmosphere, does contain sufficient oxygen to account for complete burning of the carbon particles which were deposited on the ribbon of glass 58 advancing along the molten metal bath 28. As noted hereinabove, the temperature of the structurally integral sheet of glass 60 which is discharged from the molten metal bath 28 is of the order of 1000°–1100°F. This temperature is above the automatic ignition temperature of the deposited carbon as that ignition temperature varies between 200°F to 800°F for most carbon types.

This above described theory is further supported by the fact that if carbon is sprayed onto the advancing ribbon 58 very near the discharge end of the tank structure, a clean but not textured surface is still produced. In order to produce a patterned or textured surface, it is necessary that the carbon be deposited on the advancing ribbon 58 when the ribbon 58 is at a temperature at which it is still somewhat molten and fluid. In this way, the carbon particles will be slightly embedded in the upper surface of the advancing ribbon 58 and will remain partially exposed in the upper surface as the ribbon 58 is continuously cooled into a structurally integral sheet 60. Automatic ignition and complete combustion of the exposed carbon will then take place upon introduction of the sheet 60 into the annealing lehr 46 to thereby leave the surface completely free and clean of powdered carbon when the glass 74 is removed therefrom. Accordingly, the preferred temperature at which carbon is to be deposited onto the advancing ribbon of glass 58 can vary from between 1200° and 2200°F.

Furthermore, in accordance with the above theory, if the powdered carbon is sprayed at too high a pressure, the particles of carbon may become too deeply imbedded into the surface of the advancing ribbon 58 and not be exposed to oxygen to permit complete combustion thereof. In the preferred form of the present invention, the pressure of the carbon-nitrogen mixture which is introduced into the spray header 62 is sufficient to carry the suspended carbon. This will produce a "cloud" of the carbon-nitrogen mixture within the hood 70 which then settles onto the surface of the advancing ribbon 58, the particulate carbon becoming only partially embedded in the surface. Then, when the carbon ignites within the annealing lehr 46, voids or indentations are left on the surface of the glass 74 which issues from the annealing lehr 46.

It is to be noted that the lack of knowledge of the specific mechanism by which the carbon attacks the glass ribbon 58 to produce a patterned surface thereon has no bearing on the fact that the abovedescribed method does in fact produce patterned glass 74. The suggested theory which has been set forth herein has been included merely to aid others in practicing modifications of the present invention.

Accordingly, there is disclosed herein a novel method for patterning or texturing the surface of glass produced by the float process. The method involves depositing particulate carbon onto the surface of an advancing ribbon 58 supported on a molten metal bath 28. The deposited carbon then attacks the glass ribbon 58 in a preferential manner to produce a patterned or textured surface. As is apparent, different patterns can be achieved as opposed to the disclosed texturing of substantially the entire surface of the glass by controlling the direction of the spray issuing from the nozzles 64. Also, intermittently spraying and not spraying the surface of the ribbon 58 will yield different patterns.

It will be understood that the embodiment shown and described herein is merely illustrative and that changes may be made without departing from the scope of the invention. What is sought to be protected is only that which is claimed in the appended claims.

What is claimed is:

1. A method for texturing the surface of glass manufactured by the float process comprising:
   a. introducing molten glass at a controlled rate onto a molten metal bath to form a continuous ribbon of heat softened glass;
   b. drawing said ribbon across said bath while cooling said ribbon into a structurally integral sheet;
   c. depositing particulate carbon onto the surface of said ribbon while said ribbon is being drawn across said bath; and
   d. removing said integral sheet from said molten bath and introducing said sheet into an annealing lehr having an atmosphere containing sufficient oxygen to remove substantially all said carbon while said sheet is at a temperature greater than the ignition temperature of said carbon deposited on said sheet.

2. The method of claim 1 wherein the step of depositing particulate carbon onto the surface of said ribbon comprises spraying powdered carbon from above said bath onto said ribbon as it is drawn across said bath.

3. The method of claim 2 wherein the step of spraying powdered carbon comprises spraying powdered carbon onto said ribbon when said ribbon is only partially cooled and then cooling said ribbon with said carbon thereon further as it is drawn across said bath.

4. The method of claim 3 wherein the step of spraying carbon comprises spraying powdered carbon of a size which ranges between 30 and 900 microns.

5. The method of claim 2 wherein said molten glass is introduced onto said molten metal bath when said molten glass is at a temperature between 1600°F and 2200°F, wherein said integral sheet is removed from said bath when said sheet is at a temperature between 900°F and 1200°F, and wherein said powdered carbon is sprayed onto said ribbon when said ribbon is at a temperature between 1200°F and 2200°F.

6. The method of claim 5 wherein said powdered carbon is sprayed onto said ribbon when said ribbon is at a temperature of approximately 1400°F.

7. The method of claim 2 wherein said powdered carbon is sprayed onto said ribbon when said ribbon is at a temperature at which said carbon will imbed partially into the surface of said ribbon of said heat softened glass.

8. The method of claim 2 wherein said powdered carbon is sprayed onto said ribbon when said ribbon has been partially cooled so that said carbon will imbed in only the upper surface of said glass so as to remain partially exposed to the area above said ribbon.

9. The method of claim 2 wherein the step of spraying carbon comprises spraying carbon onto said ribbon when said ribbon has been partially cooled to a temperature which is sufficient to permit said carbon to only partially imbed in the upper surface of said ribbon.

* * * * *